United States Patent
Pachov et al.

(10) Patent No.: US 9,272,885 B2
(45) Date of Patent: Mar. 1, 2016

(54) ASSEMBLY COMPRISING A SECURITY APPARATUS EQUIPPING A LIFTING DEVICE, IN PARTICULAR A WINCH, AND A SYSTEM FOR ACTUATING SAID APPARATUS

(75) Inventors: Yavor Pachov, Villeurbanne (FR); Yunus Alici, Amberieu en Bugey (FR); Rizki Kaced, Villeurbanne (FR)

(73) Assignee: SIGUREN INGENIERIE, Miribel (FR)

( * ) Notice: Subject to any disclaimer, the term of this patent is extended or adjusted under 35 U.S.C. 154(b) by 0 days.

(21) Appl. No.: 14/386,847

(22) PCT Filed: Mar. 28, 2012

(86) PCT No.: PCT/IB2012/051486
§ 371 (c)(1),
(2), (4) Date: Sep. 22, 2014

(87) PCT Pub. No.: WO2012/131595
PCT Pub. Date: Oct. 4, 2012

(65) Prior Publication Data
US 2015/0076427 A1    Mar. 19, 2015

(51) Int. Cl.
*B66D 1/14* (2006.01)
*B66D 1/54* (2006.01)
*F16H 1/16* (2006.01)
*B66D 1/12* (2006.01)

(52) U.S. Cl.
CPC .. *B66D 1/54* (2013.01); *B66D 1/12* (2013.01); *B66D 1/14* (2013.01); *F16H 1/16* (2013.01)

(58) Field of Classification Search
CPC .............. B66D 1/12; B66D 1/16; B66D 1/44; B66D 1/54; B66D 3/26; B66D 5/18; F16H 1/16
See application file for complete search history.

(56) References Cited

U.S. PATENT DOCUMENTS

| | | | |
|---|---|---|---|
| 3,836,121 A | 9/1974 | Jones | |
| 4,518,153 A * | 5/1985 | West | B66D 1/54 188/166 |
| 4,625,946 A | 12/1986 | Clark | |
| 6,085,368 A * | 7/2000 | Robert | A61G 7/1015 5/83.1 |
| 2003/0000325 A1* | 1/2003 | Hoehn | F16H 3/24 74/425 |
| 2005/0072965 A1* | 4/2005 | Sanders | B66D 1/485 254/361 |
| 2005/0092116 A1 | 5/2005 | Pachov | |
| 2011/0049450 A1* | 3/2011 | Hager | B66D 1/14 254/343 |

FOREIGN PATENT DOCUMENTS

| | | |
|---|---|---|
| DE | 3400406 | 7/1985 |
| EP | 1253102 | 10/2002 |
| JP | 7206388 | 8/1995 |

* cited by examiner

*Primary Examiner* — Emmanuel M Marcelo
(74) *Attorney, Agent, or Firm* — Defillo & Associates, Inc.; Evelyn A. Defillo

(57) ABSTRACT

This assembly includes a security apparatus equipping a lifting device, in particular a winch, and a system for actuating the apparatus The security apparatus includes a toothed wheel, wedged on the shaft of the lifting device, and a worm meshing with the toothed wheel. The assembly also includes: a splined shaft secured to one end of the worm; a pocketed wheel with inner and outer splines, engaged on the splined shaft; an elastic member between the pocketed wheel and a stop piece; a drive wheel with a splined hub, with which the pocketed wheel is capable of engaging rotationally; and a back-up motor, capable of rotating the drive wheel.

5 Claims, 5 Drawing Sheets

ASSEMBLY COMPRISING A SECURITY APPARATUS EQUIPPING A LIFTING DEVICE, IN PARTICULAR A WINCH, AND A SYSTEM FOR ACTUATING SAID APPARATUS

CROSS REFERENCE TO RELATED APPLICATION

This application is a national stage entry of PCT/IB2012/051486 filed Mar. 28, 2012, under the International Convention.

TECHNICAL FIELD

The present invention relates to an assembly comprising a security apparatus equipping a lifting device, in particular a winch, and a system for actuating said apparatus.

BACKGROUND OF THE INVENTION

It is known to equip a winch with a security apparatus comprising a toothed wheel, wedged on the shaft of the winch, a worm meshing with the toothed wheel, a housing slidingly receiving the worm, a motor, termed "follow-up motor," making it possible to rotate the worm so that it follows the rotation of the toothed wheel during normal operation of the winch, and means for damping the sliding of the worm in the housing in the case of an exceptional failure situation of the winch. This security apparatus, known under the "Moto-suiveur" mark, is described in document No. EP 1 253 102.

In a normal operating situation of the winch, the worm is in a normal position bearing against said damping means, and the follow-up motor rotates the worm at a speed adapted to that of the toothed wheel, which in turn is rotated by the winch; the security apparatus is then inactive or "transparent," i.e. it does not interfere with the operation of the winch.

In the event the winch fails, the shaft thereof undergoes an immediate acceleration generated by the weight of the load, which is transmitted to the toothed wheel of the security apparatus, and which the worm cannot follow; this results in sliding of the worm in the housing, from its aforementioned normal position toward an exceptional position stressing said damping means then, when the damping capacities of said damping means are reached, up to a stop position.

In one embodiment, these damping means comprise a piston, against which the worm bears, nozzles with a reduced section, through which the piston forces oil in which the worm soaks, elastic washers situated between the ends of the worm, and the stop formed by the housing. Such damping means are described in document No. U.S. Pat. No. 7,331,252.

The aforementioned security apparatus makes it possible to monitor said exceptional failure situation by blocking the load against falling.

At the end of that blocking, it is necessary to regain control of the load so as to release the winch, which involves accessing the security apparatus so as to rotate the worm manually, since the follow-up motor is not powerful enough to rotate the worm (this is not its role).

However, in a certain number of situations, said access is not possible or is restricted, for example when the winch is used in the nuclear industry. Furthermore, manually actuating the worm is a tedious operation, the pitch of the worm being relatively small and the diameter of the toothed wheel being relatively large.

The present invention aims to resolve these significant practical drawbacks.

Another exceptional situation exists in which the operation of the winch is stopped, i.e. when a brake comprised by the winch tightens until it locks the shaft of the winch, for example in the event of an electrical power loss. It is then no longer possible to regain control of the load easily and quickly, i.e. without a manual intervention on the security apparatus or the winch.

The present invention also aims to resolve this gap.

OBJECT OF THE INVENTION

The present invention aims to resolve the significant drawbacks above-mentioned.

SUMMARY OF THE INVENTION

The assembly covered by the invention comprises a "Moto-suiveur" security apparatus as described above, i.e. comprising a toothed wheel, wedged on the shaft of the lifting device, a worm meshing with said toothed wheel, a housing slidingly receiving the worm, a motor, termed "follow-up motor," allowing the worm to be rotated so that the latter part follows the rotation of the toothed wheel during normal operation of the lifting device, and means for damping the sliding of the worm in the housing in the case of an exceptional failure situation of the lifting device, up to a stop position of this worm in this housing.

According to the invention, said assembly also comprises:

a splined shaft secured to one end of the worm and axially extending said worm;

a pocketed wheel with inner and outer splines, slidingly engaged on the splined shaft and rotationally engaged therewith;

an elastic member whereof one end is connected to a stop piece secured to the splined shaft and whereof the other end is connected to the pocketed wheel;

a drive wheel with a splined hub, with which the pocketed wheel is capable of engaging rotationally owing to the outer splines comprised by said pocketed wheel;

a motor, termed "back-up motor," capable of rotating the drive wheel, the pocketed wheel being able to move with said splined shaft between a normal disengaged position, which it occupies outside a failure situation of the lifting device, and in which it is not engaged with the drive wheel, and an exceptional engaged position, which it occupies in a failure situation of the lifting device, and in which it is rotationally engaged with the drive wheel and thus rotationally connects the drive wheel with the splined shaft and therefore with the worm.

During normal operation of the security apparatus, the pocketed wheel is in the disengaged position and the actuating system formed by the back-up motor and the drive wheel is therefore inactive.

In a failure situation of the lifting device, the worm is moved toward its exceptional stop position, which, aside from blocking the load from falling, causes the compression of the elastic member and therefore causes the pocketed wheel to press against the driving wheel. Slowly rotating the back-up motor then makes it possible to rotate the drive wheel so as to make the splines of that drive wheel coincide with the splines of the pocketed wheel and allow the mutual engagement of said splines. A rotational connection of the drive wheel and the worm is thus produced, allowing said worm to be actuated using the back-up motor and therefore allowing the load to be actuated to move upward or downward. When the load ceases to weigh on the cable of the lifting device, the worm returns to its normal position, returning the pocketed wheel to the disengaged position.

The invention thus provides a system for actuating the security apparatus, having a sufficient driving power to actuate the worm in such an exceptional failure situation of the winch, and therefore eliminating the need to access the worm and actuate said worm manually.

When the shaft of the lifting device is locked, in particular after automatic tightening of a brake comprised by that device, the follow-up motor can be actuated so as to rotate the worm and, since the toothed wheel is then rotationally immobile, to thereby move said worm into said exceptional position for stressing the damping means, then into said stop position. In the same way as before, this movement causes the pocketed wheel to press against the driving wheel, then the slow rotation of said drive wheel using the back-up motor makes the pocketed wheel go into the engaged position. The back-up motor then makes it possible to rotate the worm, in the direction of rotation preserving the aforementioned exception position of said worm, which makes it possible to force the rotation of the toothed wheel so as to overcome the frictional force generated by the brake of the lifting device.

Advantageously, the actuating system comprises means for locking the pocketed wheel in the engaged position.

These locking means make it possible, when the worm is rotated by the back-up motor in the direction of rotation making it leave its aforementioned exceptional position and moving it toward an opposite stop position, to keep the pocketed wheel in an engaged position notwithstanding that movement of the worm. The possibility of actuating the worm using the back-up motor is therefore kept.

According to one preferred embodiment of these locking means:

the female splines of the driving wheel have a width greater than that of the male splines of the pocketed wheel, such that the flanks of said male splines are, depending on the direction of driving of the drive wheel, against first flanks delimiting the female splines of the drive wheel or against the two flanks delimiting these same female splines, opposite said first flanks;

the male splines of the pocketed wheel have wider front portions, forming lateral shoulders, said wider front portions being capable of protruding past the drive wheel in said engaged position of the pocketed wheel and, when said drive wheel is driven in the direction of rotation causing the worm to leave its exceptional position and moving said worm toward an opposite stop position, to bear against the drive wheel, thereby keeping the pocketed wheel in said engaged position, against the elastic force of the elastic member.

Once the drive wheel is driven in the opposite direction, said wider front portions return opposite the female splines of the drive wheel, thereby allowing the pocketed wheel to return to said disengaged position.

Advantageously, said wider front portions have thinner front ends, which favor the engagement thereof in the female splines of the drive wheel when the pocketed wheel enters the engaged position.

Preferably, the actuating system also comprises contactors, one of which detects the arrival of the worm in said exceptional position and the other of which detects the fact that the pocketed wheel is in said engaged position or in said disengaged position.

BRIEF DESCRIPTION OF THE DRAWINGS

Other features and advantages of the invention will appear in the following description, done in reference to the appended diagrammatic drawing, which shows, as a non-limiting example, one possible embodiment of the concerned security apparatus/actuating system assembly.

DESCRIPTION OF THE PREFERRED EMBODIMENTS

Figure 1:
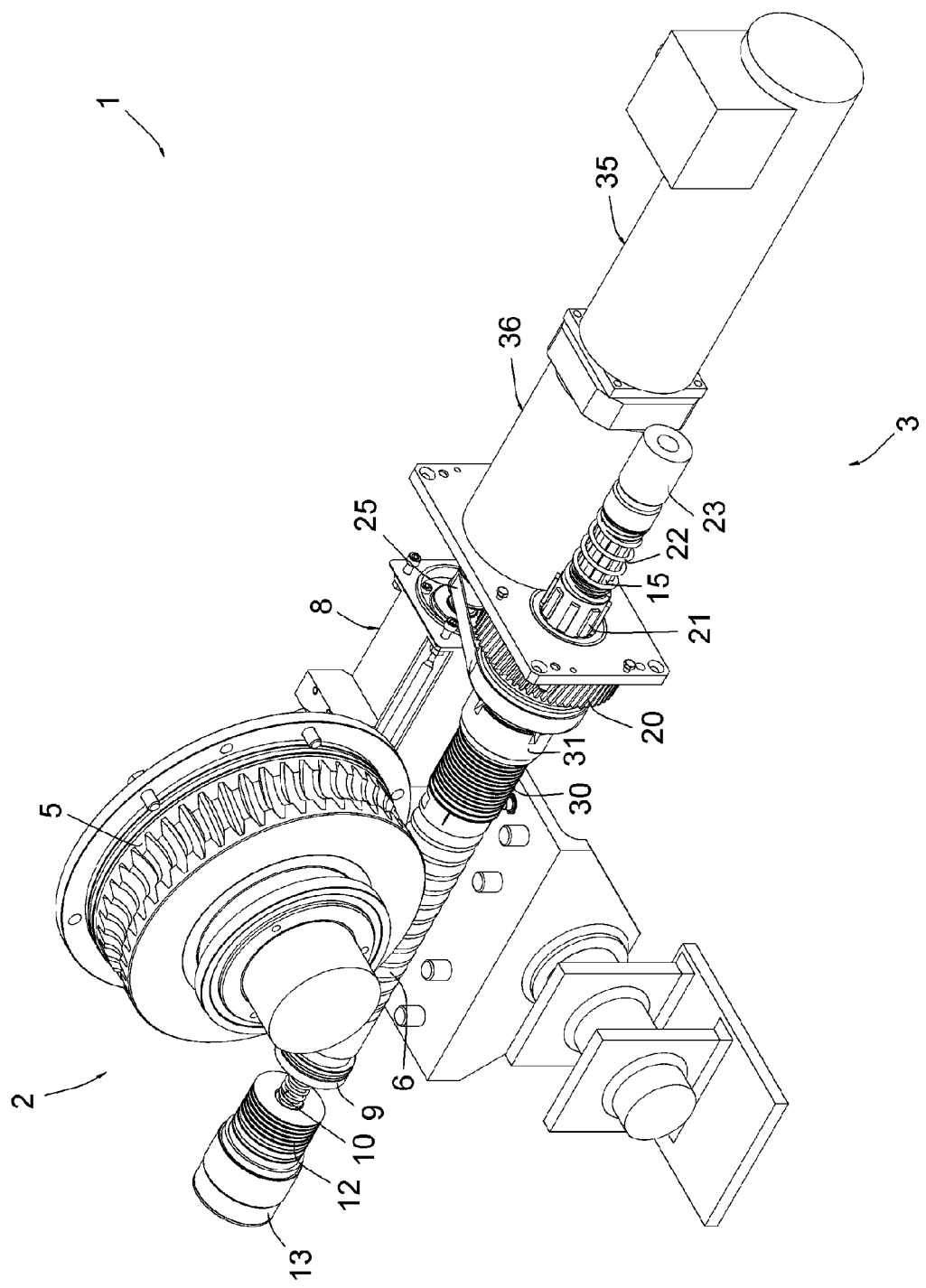
FIG. 1 is a perspective view of said apparatus, the assembly of the housing and the cases comprised by the apparatus having been removed, as well as the contactors also comprised by said apparatus.
Figure 2:
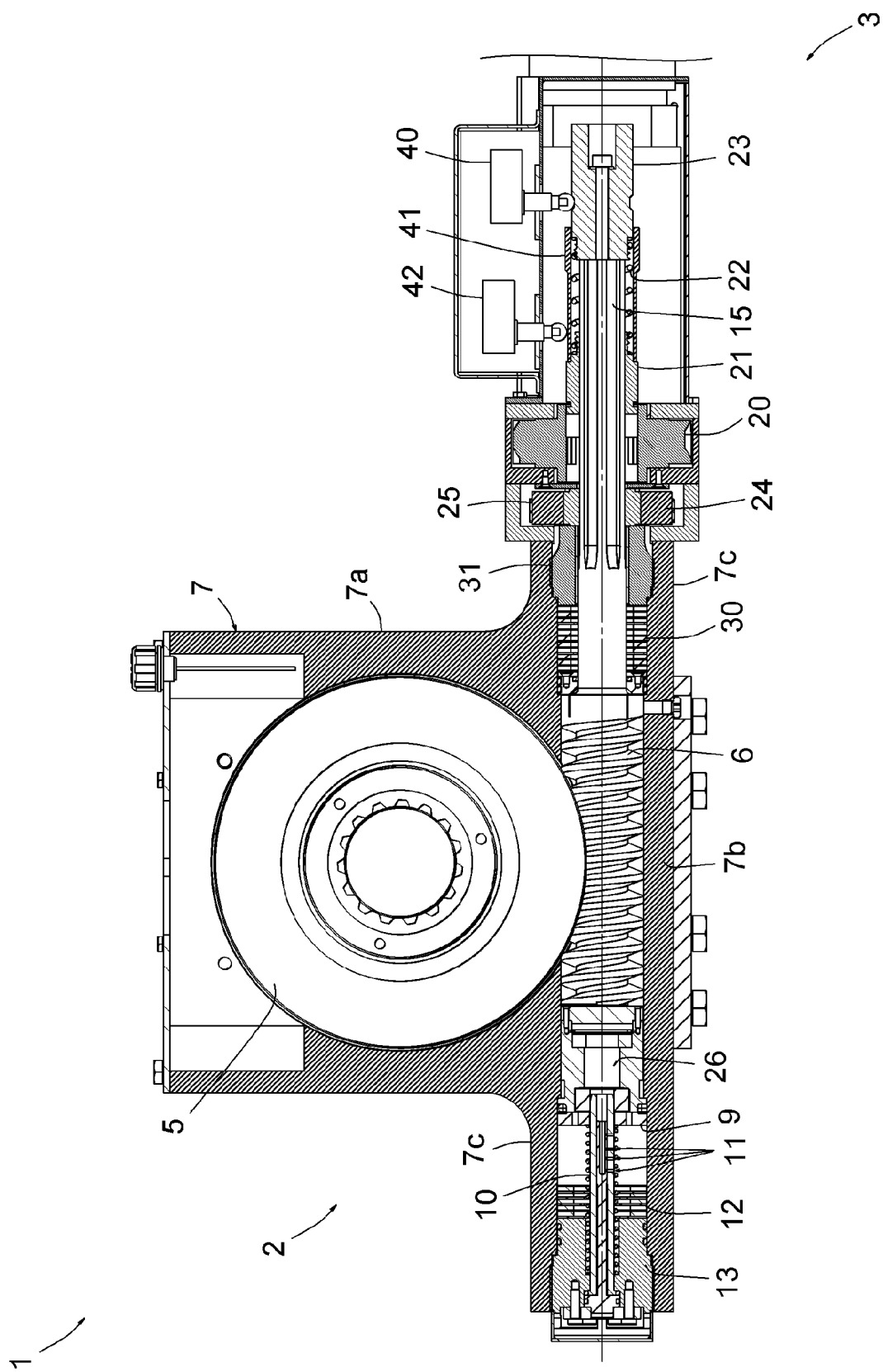
FIG. 2 is an overall side view, in a normal position of a worm it comprises in a disengaged position of a pocketed wheel it also comprises.
Figure 3:
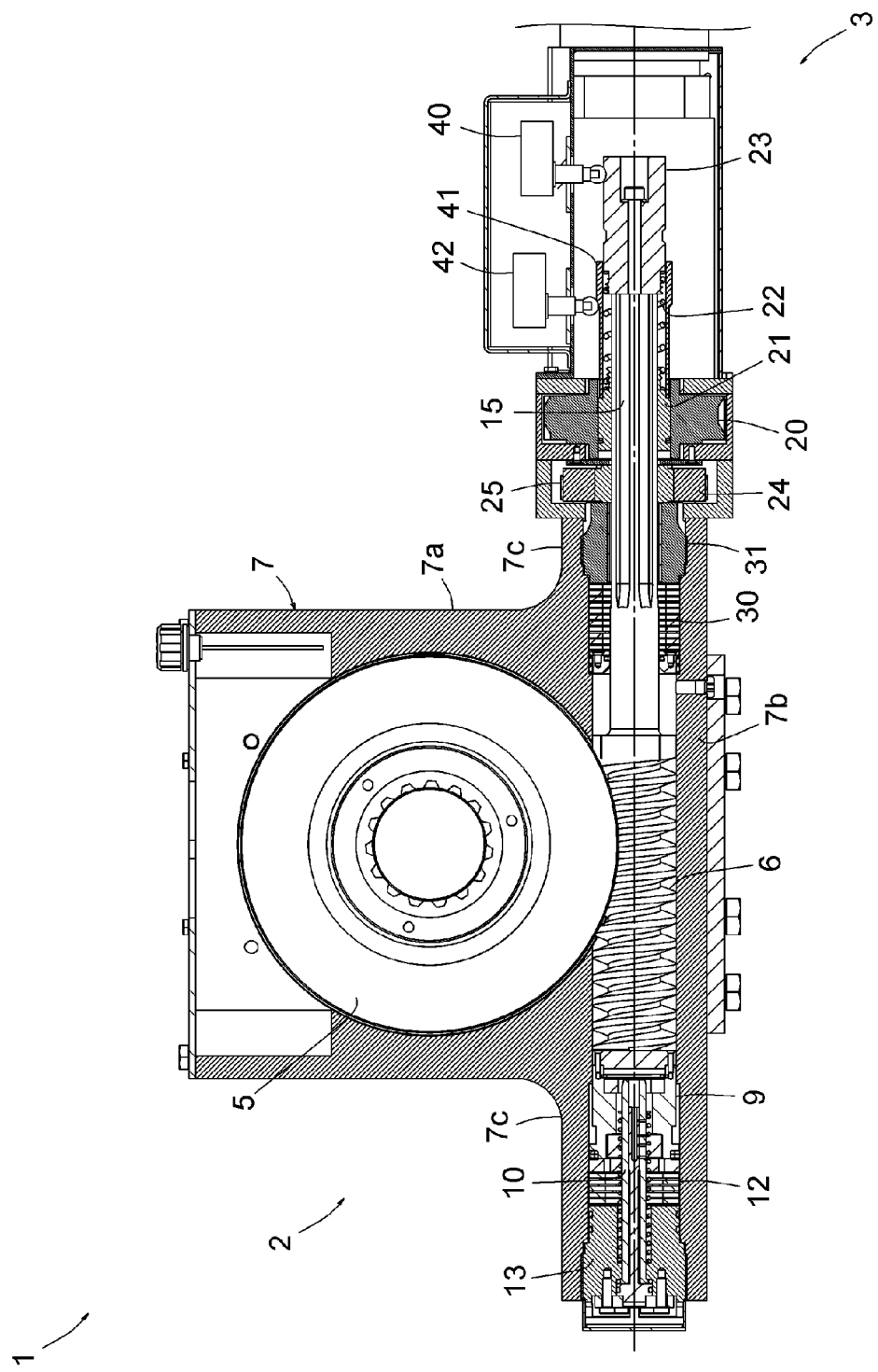
FIG. 3 is a view similar to FIG. 2, in an exceptional position of the worm and in an engaged position of the pocketed wheel.

FIGS. 1 to 3 show an assembly 1 comprising a security apparatus 2 equipping a lifting device, in particular a winch, and a system 3 for actuating said apparatus 2.

The security apparatus 2 is of the type known under the "Motorsuiveur" mark, the principle of which is described by document No. EP 1 253 102. It comprises a toothed wheel 5, wedged on the shaft of the lifting device (not shown), a worm 6 meshing with said toothed wheel 5, a housing 7 slidingly receiving the worm 6, a motor 8, termed "follow-up motor," making it possible to rotate the worm 6 so that it follows the rotation of the toothed wheel 5 during normal operation of the lifting device, and means 9 to 13 for damping the sliding of the worm 6 in the housing 7 in the case of an exceptional failure situation of the lifting device, as far as a maximal stop position of said worm 6.

The worm 6 extends axially over one side of the wheel 5 by a splined shaft 15 integral therewith. This splined shaft 15 successively comprises a drive wheel 20, an engaging/disengaging pocketed wheel 21, a spring 22 and a stop piece 23, described later, which are part of the actuating system 3.

As shown in FIGS. 2 and 3, the housing 7 forms an upper central portion 7a, comprising a bore for receiving the toothed wheel 5 in an adjusted manner, a lower central portion 7b, comprising a bore for receiving the worm 6 in an adjusted manner, and two coaxial extensions 7c, extending said bore, one of which receives said means 9 to 13 for damping the worm 6.

The follow-up motor 8 is situated along said lower central portion 7b and drives the worm 6 via a wheel 24 and a belt 25.

In the illustrated example, the weight of the load lifted by the lifting device tends to rotate the toothed wheel 5 in the clockwise direction as shown in FIGS. 2 and 3, so that in the event said lifting device fails, the worm 6 moves from right to left in said FIGS. 2 and 3. The damping means 9 to 13 are therefore situated at the extension 7c located on the left of the security apparatus 2.

These damping means comprise a piston 9, against which the worm 6 bears, a tube 10 comprising nozzles 11 with a reduced section formed through the wall thereof, elastic washers 12, and a stop piece 13 secured to the housing 7, against which the washers 12 are situated.

The piston 9 forms an inner chamber 26, with which the tube 10 communicates. When it is pressed by the worm 6 in case of failure of the lifting device, this piston 9 forces the oil present between it and the washers 12 through the nozzles 11, said oil then flowing in the chamber 26 (cf. FIGS. 2 and 3 in comparison). The nozzles 11 are aligned axially on the tube 10 and are gradually covered by the piston 9 during the movement of the worm 6, so that the section of the oil passage is gradually reduced during the movement of that piston 9, thereby increasing the damping produced. After having gone past the last nozzle 11, the piston 9, if it continues its travel, crushes the washers 12 as far as the compressibility limit thereof, which defines the stop position of the worms 6 in the housing 7.

At the opposite extension 7c (i.e. the extension located on the right in FIGS. 2 and 3), the apparatus comprises a series of washers 30 and a stop piece 31 that are similar to the aforementioned washers 12 and stop piece 13, making it possible to damp the movement of the worm 6 from left to right in certain situations, as will be described later.

Aside from the drive wheel 20, the pocketed wheel 21, the spring 22 and the stop part 23, the actuating system 3 comprises a motor 35, termed "back-up motor," and a step-down gear 36 driven by said motor 35.

The drive wheel 20 meshes with the pinion 37 (FIG. 6) at the output of the gear 36 and is therefore driven by the motor 35. As shown more particularly in FIG. 4, it comprises a splined hub capable of engaging with the outer splines comprised by the pocketed wheel 21.

Figure 4:
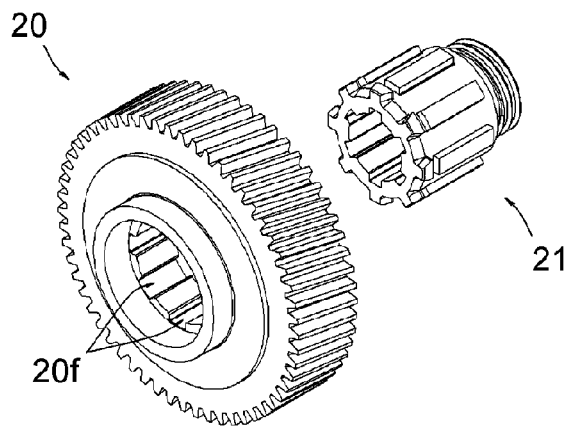
FIG. 4 is a perspective view of the pocketed wheel and a drive wheel with which said pocketed wheel is intended to be rotationally engaged.
Figure 5:
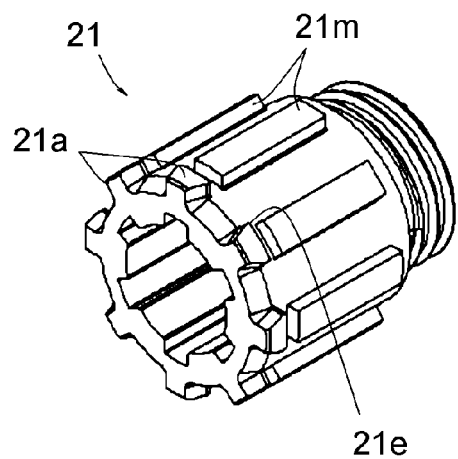
FIG. 5 is a view of the pocketed wheel similar to FIG. 4, on a larger scale.

The latter part, visible in FIGS. 4 and 5, comprises inner splines allowing it to engage rotationally with the splined shaft 15 and allowing it the possibility of sliding axially thereon, and the aforementioned outer splines allow it to engage with the drive wheel 20. The pocketed wheel 21 can move with the splined shaft 15, and therefore with the worm 6, between a normal disengaged position, which it occupies outside a failure situation of the lifting device, and in which it is not engaged with the drive wheel 20 (cf. FIGS. 2 and 6), and an exceptional engaged position, which it occupies in a failure situation of the lifting device, and in which it is rotationally engaged with the drive wheel 20 and thereby produces a rotational connection of said drive wheel 20 with the splined shaft 15 and therefore with the worm 6 (cf. FIGS. 3 and 7).

Furthermore,
the female splines 20f of the hub of the drive wheel 20 have a width larger than that of the male outer splines 21m of the pocketed wheel 21, such that the flanks of said male outer splines 21m come, depending on the driving direction of the drive wheel 20 relative to the shaft 15, against first flanks laterally delimiting said female splines 20f or against the second flanks laterally delimiting these same female splines 20f, opposite said first flanks;

each male outer spline 21m has a wider front portion 21a, forming a lateral shoulder 21e that protrudes laterally relative to one of the lateral flanks of the spline 21m.

As shown in FIG. 5, each wider front portion 21a has lateral flanks that converge toward one another in the direction of the front end of the pocketed wheel 21, thereby favoring the engagement of those portions 21a in the female splines 20f.

Figure 6:
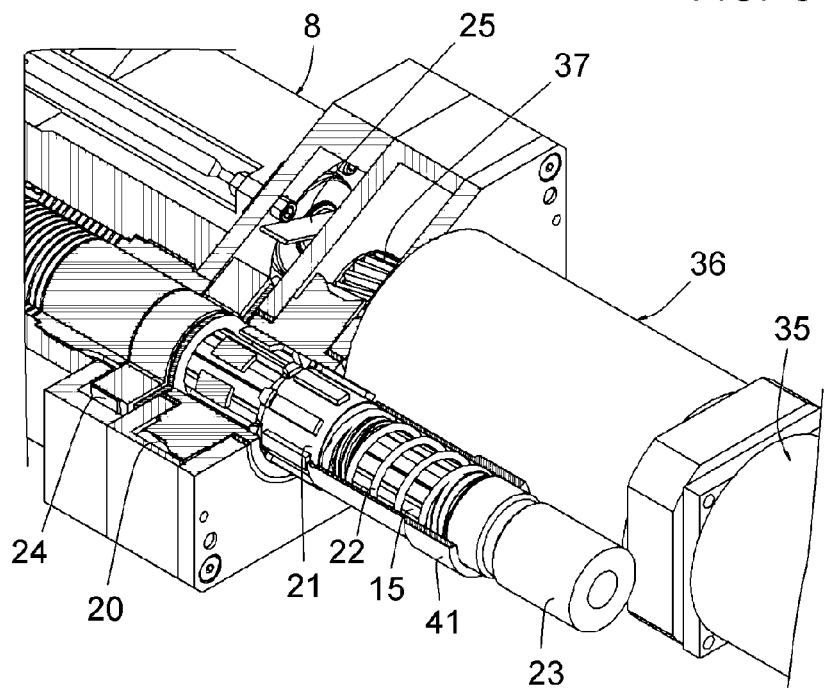
FIG. 6 is a partial view of said assembly, in perspective and with a partial cross-section, the pocketed wheel being in the disengaged position.
Figure 7:
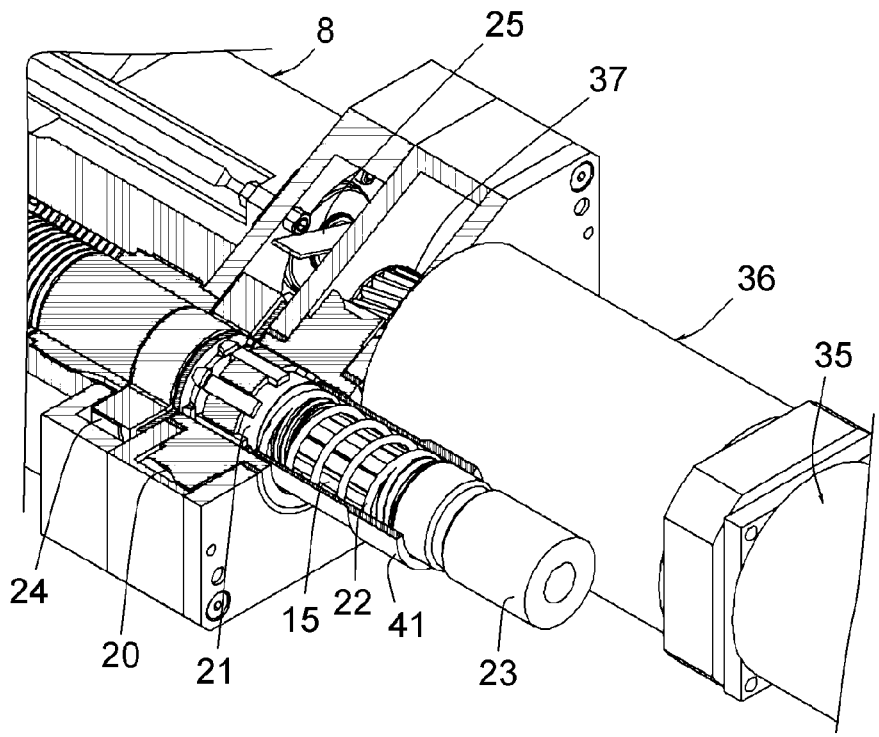
FIG. 7 is a view similar to FIG. 6, the pocketed wheel being in the engaged position.
Figure 8:
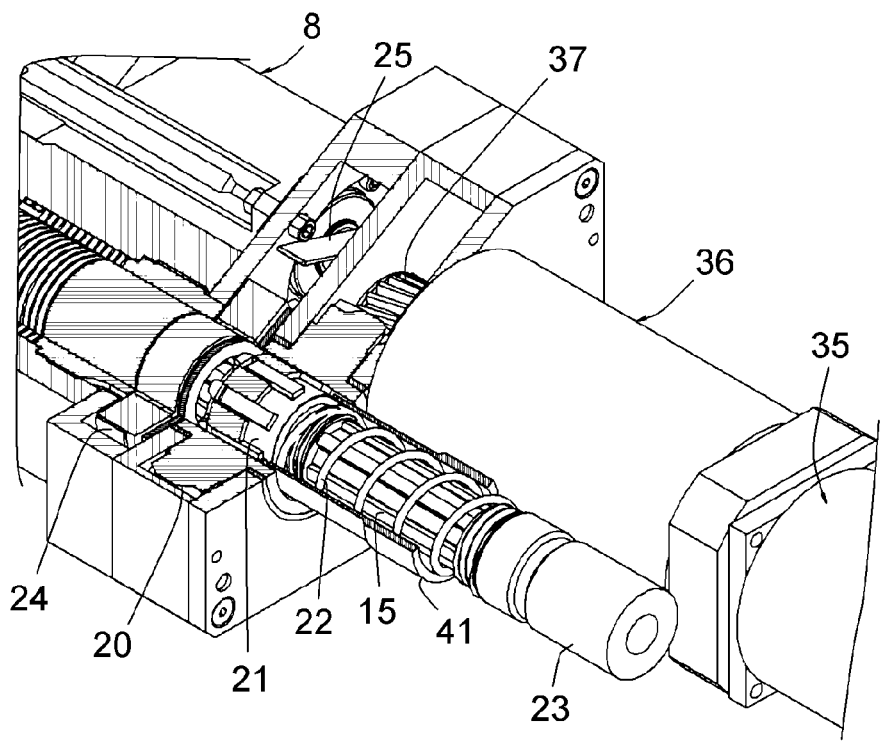
FIG. 8 is a view similar to FIG. 7, the pocketed wheel being in a locked engaged position.

As will be understood in reference to FIGS. 6 to 8, these wider front portions 21a can protrude past the drive wheel 20 in said engaged position; when said drive wheel 20 is driven in the direction of rotation moving the worm 6 from left to right in FIGS. 2 and 3 (which is the counterclockwise direction of said wheel 20 as seen in FIGS. 6 to 8), toward a stop position of said worm 6 against the washers 30, said lateral shoulders 21a protrude laterally past the female splines 20f and bear against the drive wheel 20, thereby keeping the pocketed wheel 21 in said engaged position (cf. FIG. 8). These lateral shoulders 21e consequently form, with the drive wheel 20, means for locking the pocketed wheel 21 in said engaged position.

The spring 22 is engaged on the shaft 15 while being inserted between the pocketed wheel 21 and the stop piece 23 and is connected to the pocketed wheel 21 by one end and to the stop piece 23 by the other end.

Said spring 22 is relaxed in the disengaged position of the pocketed wheel 21 shown in FIGS. 1, 2 and 6, so that it defines that disengaged position. When the worm 6 is moved from right to left until it comes into contact with the washers 12, the stop piece 23 is moved with the shaft 15, which makes the pocketed wheel 21 bear against the hub of the drive wheel 20 and compresses the spring 22.

Furthermore, as shown by FIGS. 2, 3, and 6 to 8, the actuating system 3 comprises:

an assembly for detecting the normal position of the worm 6-shaft 15-stop piece 23 assembly, formed by a groove arranged in the stop piece 23 and by a contactor 40 whereof the detection member is moved radially depending on whether its end is engaged in said groove; and an assembly for detecting the engaged position of the pocketed wheel 21, formed by a sleeve 41 provided with a shoulder, covering the spring 22 and connected to the pocketed wheel 21, and by a contactor 42 whereof the detection member is moved radially depending on whether its end is opposite said shoulder.

During normal operation of the security apparatus 2, the pocketed wheel 21 is in the disengaged position and the actuating system 3 is therefore inactive (cf. FIGS. 2 and 6).

In a failure situation of the lifting device, the worm 6 is moved toward its exceptional position abutting against the washers 12, which, aside from blocking the load from falling, causes the pocketed wheel 21 to abut against the hub of the drive wheel 20 and the compression of the spring 22, which thereby exerts pressure on the pocketed wheel 21. Slowly rotating the back-up motor 35 then makes it possible to rotate the drive wheel 20 so as to make the splines 20f of that drive wheel 20 coincide with the portions 21a of the splines 21m and thereby allow the mutual engagement of said splines. A rotational connection of the drive wheel 20 and the worm 6 is thus produced, allowing said worm to be actuated by the back-up motor 35 and therefore allowing the load to be moved upward or downward.

When the toothed wheel 5 is immobilized, in particular when the load is set down and ceases to weigh on the security apparatus, the worm 6, through its rotation, returns to its normal position. When said worm 6 has been actuated in its screwing direction relative to the toothed wheel 5 (clockwise driving of the drive wheel 20), the front ends 21a of the splines 21m are opposite the female splines 20f and the direct return of the pocketed wheel 21 to the disengaged position is thus made possible under the effect of the elastic return of the spring 22; when the worm 6 has been actuated in the unscrewing direction thereof relative to the toothed wheel 5 (counterclockwise driving of the drive wheel 20), the front ends 21a of the splines 21m are angularly offset relative to the female splines 20f and the shoulders 21e bear against the drive wheel 20, then the spring 22 is stretched; a slow rotation of the drive wheel 20 in the clockwise direction, using the back-up motor 35, makes it possible to bring the female splines 20f opposite the front ends 21*a* of the splines 21 and therefore to free the shoulders 21*e* from their bearing against the drive wheel 20, thereby allowing the pocketed wheel 21 to return to the disengaged position under the effect of the elastic return of the spring 22.

In a locking situation of the shaft of the lifting device, in particular following the automatic tightening of a brake comprised by that device, the follow-up motor is actuated so as to rotate the worm 6 in the screwing direction thereof relative to the toothed wheel 5. Since the toothed wheel 5 is then rotationally immobile, this driving moves the worm 6 toward the washers 12 as far as the stop position of said worm against the latter parts. In the same way as before, this movement causes the pocketed wheel 21 to press against the drive wheel 20, then the slow rotation of said drive wheel by the back-up motor 35 causes the pocketed wheel 21 to go to the engaged position. The back-up motor 35 then makes it possible to rotate the worm 6 in the screwing direction relative to the toothed wheel 5 (driving of the wheel 20 in the clockwise direction), which makes it possible to force the rotation of said toothed wheel 5 so as to overcome the frictional force generated by the brake of the lifting device and to thereby move the load downward.

If one wishes to move the load upward, the worm 6 is then rotated by the back-up motor 35 in the unscrewing direction thereof relative to the toothed wheel 5 (driving of the wheel 20 in the counterclockwise direction), which brings said worm 6 to a stop position against the washers 30; as of the beginning of this movement of the worm 6, the shoulders 21*e* bear against the drive wheel 20, thereby making it possible to keep the pocketed wheel 21 in the engaged position. When the load is under control, the drive wheel 20 is then driven in the clockwise direction so as to return the female splines 20*f* opposite the wider front ends 21*a* of the male splines 21*m*, thereby freeing the return of the pocketed wheel 21 to the disengaged position.

As appears from the preceding, the invention provides an assembly comprising a security apparatus 2 termed "Motosuiveur®" and a system 3 for actuating that apparatus, with the following decisive advantages:

the actuating system 3 has a sufficient drive power to actuate the worm 6 in a failure situation of the lifting device, and therefore eliminates the need to access the worm 6 and actuate said worm manually;

in a stop situation of the operation of the lifting device, in particular when a brake comprised by the device tightens until it blocks the shaft of said device, said assembly 1 makes it possible to regain control of the load easily and quickly, i.e. without manual intervention on the security apparatus or the lifting device, and to move that load both upward and downward.

The invention has been described above in reference to one preferred embodiment. It is of course not limited to that embodiment, but on the contrary extends to all other embodiments covered by the appended claims.

What is claimed is:

1. An assembly comprising:
a security apparatus equipping a lifting device and
a system for actuating said security apparatus;
the security apparatus comprises a toothed wheel, wedged on a shaft of the lifting device, a worm meshing with said toothed wheel, a housing slidingly receiving the worm, a follow-up motor for allowing the worm to be rotated to follow the rotation of the toothed wheel during normal operation of the lifting device, and a device for damping the sliding of the worm in the housing in the case of an exceptional failure situation of the lifting device, up to a stop position of the worm in the housing;
wherein said assembly further comprises:
a splined shaft secured to one end of the worm and axially extending said worm;
a pocketed wheel with inner and outer splines, slidingly engaged on the splined shaft and rotationally engaged therewith;
an elastic member whereof one end is connected to a stop piece secured to the splined shaft and whereof the other end is connected to the pocketed wheel;
a drive wheel with a splined hub, with which the pocketed wheel is capable of engaging rotationally owing to the outer splines comprised by said pocketed wheel;
a back-up motor for rotating the drive wheel,
the pocketed wheel moves with said splined shaft between a normal disengaged position, which it occupies outside a failure situation of the lifting device, and in which it is not engaged with the drive wheel, and an exceptional engaged position, which it occupies in a failure situation of the lifting device, and in which it is rotationally engaged with the drive wheel and thus rotationally connects the drive wheel with the splined shaft and therefore with the worm.

2. The assembly according to claim 1, wherein the actuating system comprises a device for locking the pocketed wheel in the engaged position.

3. The assembly according to claim 2, wherein:
female splines of the drive wheel have a width greater than male splines of the pocketed wheel, such that flanks of said male splines are, depending on the direction of driving of the drive wheel, against first flanks delimiting the female splines of the drive wheel or against second flanks delimiting the female splines, opposite said first flanks;
the male splines of the pocketed wheel have wider front portions, forming lateral shoulders, said wider front portions being capable of protruding past the drive wheel in said engaged position of the pocketed wheel and, when said drive wheel is driven in the direction of rotation causing the worm to leave its exceptional position and moving said worm toward an opposite stop position, to bear against the drive wheel, thereby keeping the pocketed wheel in said engaged position, against the elastic force of the elastic member.

4. The assembly according to claim 3, wherein said wider front portions have thinner front ends.

5. The assembly according to claim 1, wherein the actuating system further comprises contactors, one of which detects the arrival of the worm in said exceptional position and the other of which detects the fact that the pocketed wheel is in said engaged position or in said disengaged position.

* * * * *